(12) United States Patent
Rokkan et al.

(10) Patent No.: US 10,641,914 B2
(45) Date of Patent: May 5, 2020

(54) REMOVABLE FASTENING MECHANISM FOR MARINE DEPLOYMENT OF AUTONOMOUS SEISMIC NODES

(71) Applicant: Seabed Geosolutions B.V., Leidschendam (NL)

(72) Inventors: Arne Henning Rokkan, Olsvik (NO); Johan Fredrik Næs, Trondheim (NO)

(73) Assignee: Seabed Geosolutions B.V., Leidschendam (NL)

( * ) Notice: Subject to any disclaimer, the term of this patent is extended or adjusted under 35 U.S.C. 154(b) by 323 days.

(21) Appl. No.: 15/728,434

(22) Filed: Oct. 9, 2017

(65) Prior Publication Data

US 2018/0106921 A1 Apr. 19, 2018

Related U.S. Application Data

(60) Provisional application No. 62/409,226, filed on Oct. 17, 2016.

(51) Int. Cl.
   - G01V 1/20 (2006.01)
   - G01V 1/38 (2006.01)
   - B63B 21/08 (2006.01)

(52) U.S. Cl.
   CPC .............. *G01V 1/201* (2013.01); *B63B 21/08* (2013.01); *G01V 1/202* (2013.01); *G01V 1/3852* (2013.01); *G01V 2210/1427* (2013.01)

(58) Field of Classification Search
   CPC ...... G01V 1/201; G01V 1/3852; G01V 1/202; G01V 2210/1427; B63B 21/08
   See application file for complete search history.

(56) References Cited

U.S. PATENT DOCUMENTS

| 2,166,916 A | 7/1939 | Lombard |
| 4,313,392 A | 2/1982 | Guenther et al. |

(Continued)

FOREIGN PATENT DOCUMENTS

| CA | 2887400 A1 | 4/2006 |
| EP | 1870733 A3 | 9/2009 |

(Continued)

OTHER PUBLICATIONS

Cranford, A Direct-Recording Ocean-Bottom Seismograph, Bulletin of the Seismological Society of America, vol. 66, No. 2, 607-615 (Apr. 1976) ("Cranford").

(Continued)

*Primary Examiner* — Ian J Lobo
(74) *Attorney, Agent, or Firm* — Park, Vaughan, Fleming & Dowler LLP; Shane Nelson

(57) ABSTRACT

Embodiments, including apparatuses, systems, and methods, for attaching autonomous seismic nodes directly to a deployment cable. The nodes may be attached to the deployment cable by a removable fastener or insert. The fastener may be a staple that surrounds the cable and rigidly couples to the node to securely fasten the cable to the node. The fastener may be secured into the node itself, a housing or enclosure surrounding the node, or into a receiver or mechanism attached to the node. Other fasteners besides a staple may include bands, wires, pins, straps, ties, clamps, and other similar devices that may be inserted around a portion of the deployment line and be removably coupled to the node. After retrieval of the node, the fastener may be removed and discarded.

22 Claims, 8 Drawing Sheets

(56) References Cited

U.S. PATENT DOCUMENTS

| | | | |
|---|---|---|---|
| 4,879,719 A * | 11/1989 | Dumestre,III | F16B 21/02 367/20 |
| 4,912,817 A | 4/1990 | Sandreid | |
| 5,070,805 A | 12/1991 | Plante | |
| 5,130,954 A | 7/1992 | Fussell | |
| 5,384,751 A * | 1/1995 | Blier | G01V 1/3843 114/244 |
| 6,024,344 A | 2/2000 | Buckley | |
| 6,044,786 A | 4/2000 | Dudley | |
| 6,288,972 B1 | 9/2001 | Norris | |
| 6,622,976 B1 | 9/2003 | Ianello | |
| 6,657,921 B1 | 12/2003 | Ambs | |
| 6,948,689 B2 | 9/2005 | Kenney | |
| 6,951,138 B1 | 10/2005 | Jones | |
| 6,975,560 B2 | 12/2005 | Berg et al. | |
| 7,092,315 B2 | 8/2006 | Olivier | |
| 7,254,093 B2 | 8/2007 | Ray | |
| 7,260,024 B2 | 8/2007 | Goujon | |
| 7,286,442 B2 | 10/2007 | Fulshear | |
| 7,310,287 B2 | 12/2007 | Ray | |
| 7,561,493 B2 | 7/2009 | Ray | |
| 7,602,667 B2 | 10/2009 | Thompson | |
| 7,646,670 B2 | 1/2010 | Maxwell | |
| 7,649,803 B2 | 1/2010 | Ray | |
| 7,668,047 B2 | 2/2010 | Ray | |
| 7,675,821 B2 | 3/2010 | Berg et al. | |
| 7,724,607 B2 | 5/2010 | Ray | |
| 7,778,114 B2 | 8/2010 | Goujon | |
| 7,804,737 B2 | 9/2010 | Thompson | |
| 7,883,292 B2 | 2/2011 | Thompson | |
| 7,929,378 B2 | 4/2011 | Gros | |
| 7,933,165 B2 | 4/2011 | Thompson | |
| 7,986,589 B2 | 7/2011 | Ray | |
| 7,990,803 B2 | 8/2011 | Ray | |
| 8,021,080 B2 | 9/2011 | Frivik | |
| 8,050,140 B2 | 11/2011 | Ray | |
| 8,087,848 B2 | 1/2012 | Thompson | |
| 8,096,253 B1 | 1/2012 | Ruffa | |
| 8,127,706 B2 | 3/2012 | Thompson et al. | |
| 8,149,647 B2 | 4/2012 | Borgen | |
| 8,172,480 B2 | 5/2012 | Thompson | |
| 8,226,328 B2 | 7/2012 | Thompson | |
| 8,228,761 B2 | 7/2012 | Ray | |
| 8,328,467 B2 | 12/2012 | Thompson | |
| 8,427,900 B2 | 4/2013 | Fieure | |
| 8,619,495 B2 | 12/2013 | Thompson | |
| 8,675,446 B2 | 3/2014 | Gateman | |
| 8,801,328 B2 | 8/2014 | Thompson | |
| 8,864,416 B2 | 10/2014 | Thompson | |
| 8,879,362 B2 | 11/2014 | Ray | |
| 8,942,059 B2 | 1/2015 | Furuhaug | |
| 9,090,319 B2 | 7/2015 | Brizard et al. | |
| 9,170,344 B2 | 10/2015 | Lindberg | |
| 9,429,671 B2 | 8/2016 | Rokkan | |
| 9,459,366 B2 | 10/2016 | Henman et al. | |
| 9,494,700 B2 | 11/2016 | Henman et al. | |
| 9,523,780 B2 | 12/2016 | Naes et al. | |
| 9,541,663 B2 | 1/2017 | Rokkan et al. | |
| 9,829,589 B2 | 11/2017 | Ray et al. | |
| 2005/0052951 A1 | 3/2005 | Clifford et al. | |
| 2005/0276161 A1 | 12/2005 | Olivier | |
| 2007/0137003 A1 | 6/2007 | Zebe, Jr. | |
| 2008/0080318 A1 | 4/2008 | Maxwell | |
| 2010/0054079 A1 | 3/2010 | Thompson et al. | |
| 2011/0217123 A1 | 9/2011 | Jewell | |
| 2013/0028047 A1 | 1/2013 | Georgievich | |
| 2013/0163374 A1 | 6/2013 | Herrmann | |
| 2013/0263410 A1 * | 10/2013 | Woodard | F16G 11/143 24/115 R |
| 2014/0198607 A1 | 7/2014 | Etienne | |
| 2014/0211589 A1 | 7/2014 | Maxwell | |
| 2015/0331126 A1 | 11/2015 | Lambert et al. | |
| 2015/0362606 A1 | 12/2015 | Henman et al. | |
| 2016/0041280 A1 | 2/2016 | Naes et al. | |
| 2016/0041284 A1 | 2/2016 | Rokkan et al. | |

FOREIGN PATENT DOCUMENTS

| | | | |
|---|---|---|---|
| GB | 2492889 | 1/2013 | |
| WO | 2005074426 A2 | 8/2005 | |
| WO | 2006041438 A1 | 4/2006 | |
| WO | 2011139159 A1 | 11/2011 | |
| WO | 2014027892 A1 | 2/2014 | |
| WO | 2014084741 A1 | 6/2014 | |
| WO | 2014185787 A1 | 11/2014 | |
| WO | WO-2016130019 A1 * | 8/2016 | B63B 21/66 |

OTHER PUBLICATIONS

Mattaboni, MITOBs: A Seismometer System for Ocean-Bottom Earthquake Studies, Marine Geophysical Researches 3 (1977), pp. 87-102 ("Mattaboni").

http://www.carrack.co.uk/minidobs.htm ("Carrack"), Carrack Measurement Technology, downloaded Jun. 20, 2017.

Willoughby, A Microprocessor-Based Ocean-Bottom Seismometer, Bulletin of the Seismological Society of America, vol. 83, No. 1., 190-217 (Feb. 1993) ("Willoughby").

Prothero, First Noise and Teleseismic Recordings on a New Ocean Bottom Seismometer Capsule, Bulletin of the Seismological Society of America, vol. 74, No. 3., 1043-1058 (Jun. 1984) ("Prothero").

Johnson, A Free-Fall Direct-Recording Ocean Bottom Seismograph, Marine Geophysical Researches 3 103-117 (1977) ("Johnson").

Sutton, Optimum Design of Ocean Bottom Seismometers, Marine Geophysical Researches 9 (1987), pp. 47-65 ("Sutton").

Schmalfeldt, Explosion-Generated Seismic Interface Waves in Shallow Water: Experimental Results, Saclantcen Report SR-71 (1983) ("Schmalfeldt").

Eguchi, A real-time observation network of ocean-bottom-seismometers deployed at the Sagami trough subduction zone, central Japan, Marine Geophysical Researches 20: 73-94, 1998 ("Eguchi").

Kirk, A Three-Component Ocean Bottom Seismograph for controlled Source and Earthquake Seismology, Marine Geophysical Researches 5, 1982, 327-341 ("Kirk").

Petition for Inter Partes Review of U.S. Pat. No. RE45,268, dated Apr. 27, 2018.

Petition for Inter Partes Review of U.S. Pat. No. 8,879,362, dated Apr. 27, 2018.

Petition for Inter Partes Review of U.S. Pat. No. 8,228,761, dated Apr. 27, 2018.

Wilcock, W. S. D. et al. "The Deployment of a Long-Term Seafloor Seismic Network on the Juan de Fuca Ridge", Oceans 2007, IEEE, Piscataway, NJ USA, Sep. 29, 2007 (Sep. 29, 2007), pp. 1-6.

* cited by examiner

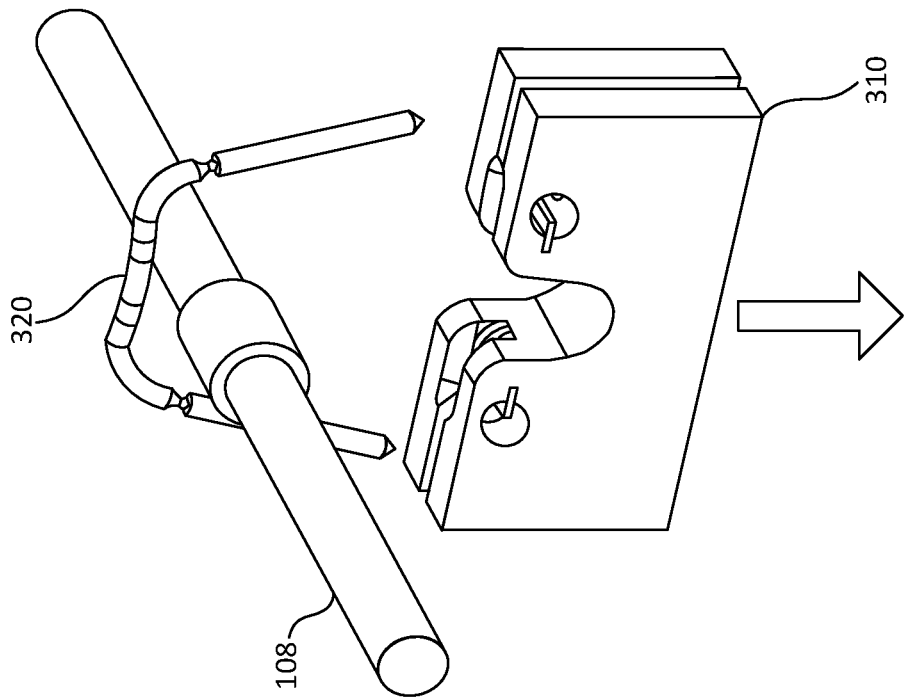
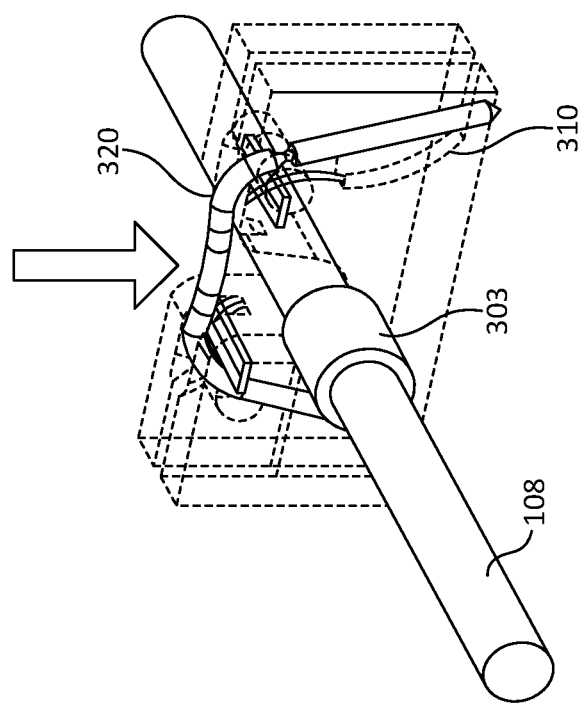
FIG. 3D
FIG. 3C

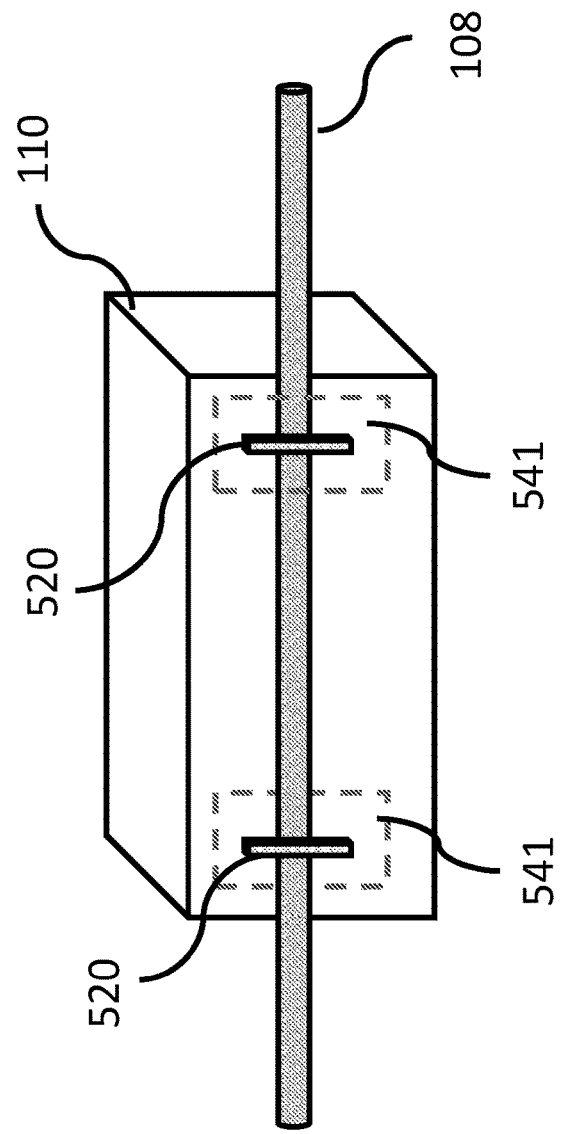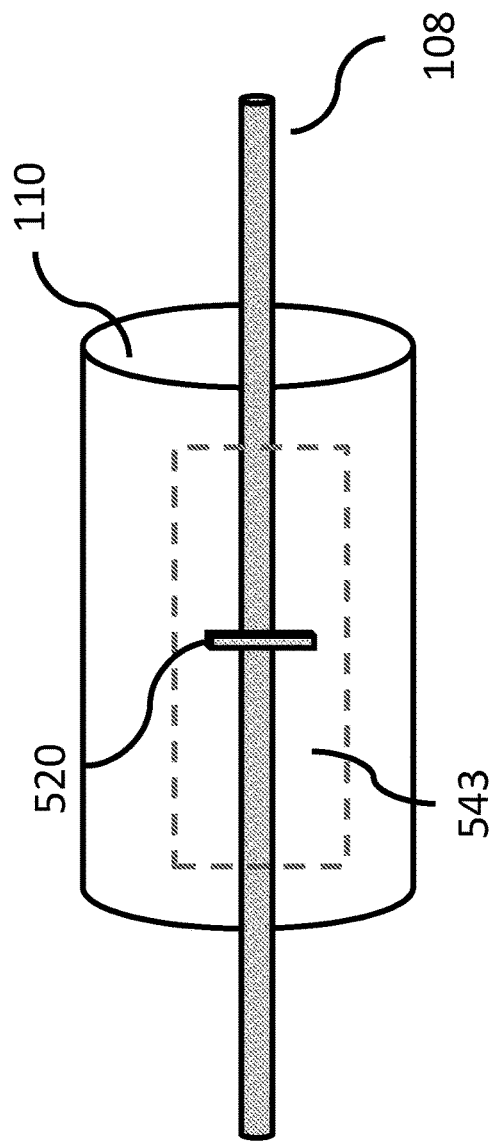
FIG. 5A
FIG. 5B

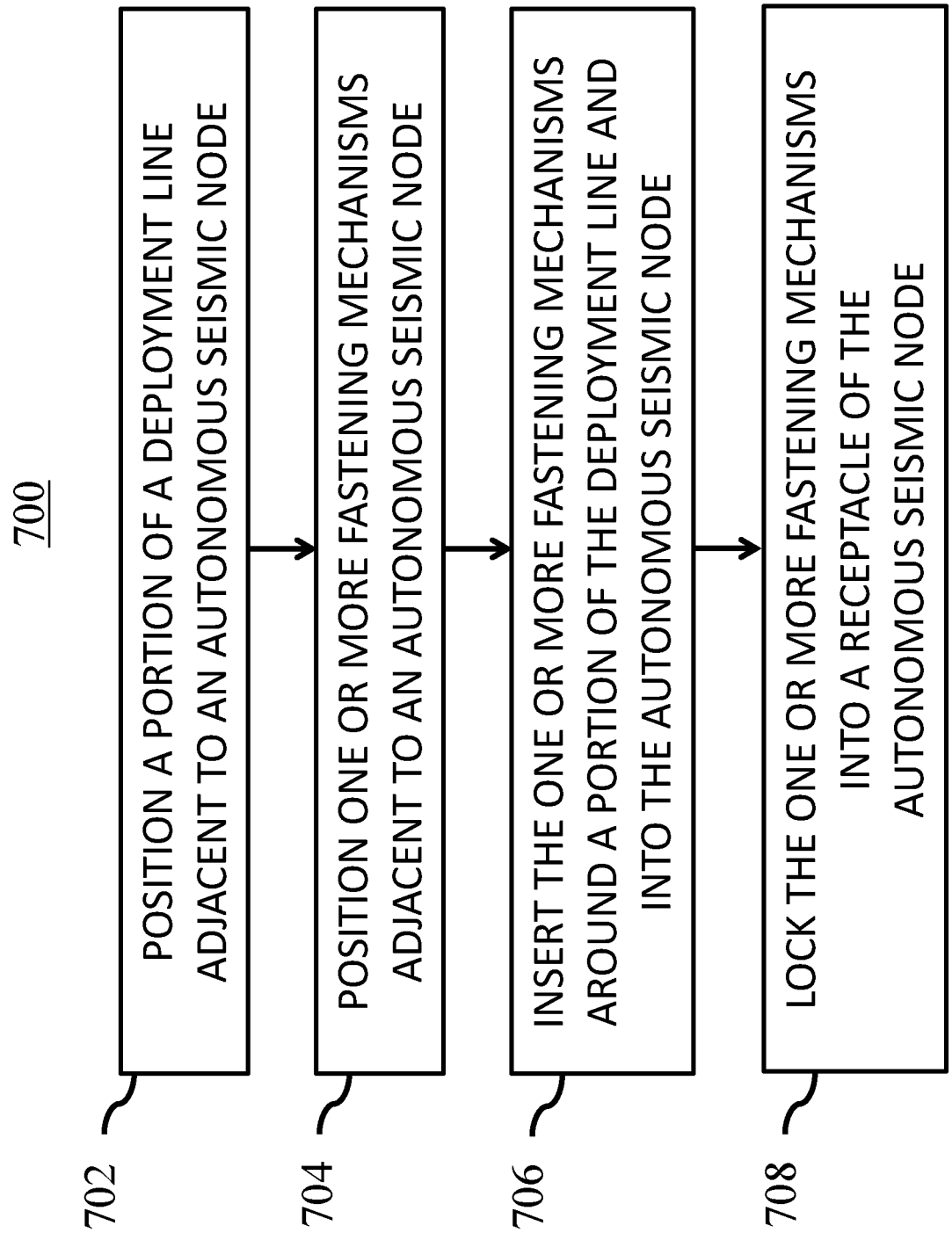

REMOVABLE FASTENING MECHANISM FOR MARINE DEPLOYMENT OF AUTONOMOUS SEISMIC NODES

PRIORITY

This application claims priority to U.S. provisional patent application No. 62/409,226, filed on Oct. 17, 2016, the entire content of which is incorporated herein by reference.

BACKGROUND OF THE INVENTION

Field of the Invention

This invention relates to marine seismic systems and more particularly relates to attachment devices utilized for marine deployment of autonomous seismic nodes to a deployment line or cable.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment. Various designs of ocean bottom autonomous nodes are well known in the art. Prior autonomous nodes include spherical shaped nodes, cylindrical shaped nodes, and disk shaped nodes. Other prior art systems include a deployment rope/cable with integral node casings or housings for receiving autonomous seismic nodes or data recorders. Some of these devices and related methods are described in more detail in the following patents, incorporated herein by reference: U.S. Pat. Nos. 6,024,344; 7,310,287; 7,675,821; 7,646,670; 7,883,292; 8,427,900; and 8,675,446.

The Applicant developed node attachment mechanisms and installation systems and methods as found in U.S. Pat. Nos. 9,494,700 and 9,541,663, incorporated herein by reference. While the systems described in these patents are useful and are significant improvements over prior art attachment methods for autonomous seismic nodes, these nodes typically require specific node locks on each autonomous seismic node and a system for the attachment and detachment of a deployment line to the node locks on the nodes.

A need exists for an improved attachment mechanism for a node to a deployment line that can be readily attached and detached without complicated equipment. A need exists for a removably attached fastener to secure the deployment line to the node.

SUMMARY OF THE INVENTION

Embodiments, including apparatuses, systems, and methods, for attaching autonomous seismic nodes directly to a deployment cable. The nodes may be attached to the deployment cable by a removable fastener or insert. The fastener may be a staple that surrounds the cable and rigidly couples to the node to securely fasten the cable to the node. The fastener may be secured into the node itself, a housing or enclosure surrounding the node, or into a receiver or mechanism attached to the node. Other fasteners besides a staple may include bands, wires, pins, straps, ties, clamps, and other similar devices that may be inserted around a portion of the deployment line and be removably coupled to the node. After retrieval of the node, the fastener may be removed and discarded.

In one embodiment, the present disclosure is directed to an autonomous seismic node for marine deployment to the seabed that comprises one or more fastener receptacles configured to secure a portion of a deployment line to the node by one or more removable fastening devices. The fastener receptacle may be configured to receive the one or more removable fastening devices.

In another embodiment disclosed is an attachment device for attaching an autonomous seismic node to a deployment line that comprises at least one fastening receptacle configured to secure a portion of a deployment line to an autonomous seismic node. The fastening receptacle may be configured to receive one or more removable fastening devices and a portion of the deployment line.

A method for deploying the disclosed autonomous seismic nodes may include deploying a deployment line into a body of water from a back deck of a marine vessel and attaching a plurality of autonomous seismic nodes to the deployment line during deployment. Each of the plurality of autonomous seismic nodes may be attached to the deployment line by positioning a portion of the deployment line next to the autonomous seismic node and coupling a removable fastening mechanism to the node and the portion of the deployment line.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIGS. 3A-3D illustrates one embodiment of a fastening mechanism for an autonomous seismic node according to the present disclosure.

FIGS. 5A and 5B illustrates various embodiments of a fastening mechanism for an autonomous seismic node according to the present disclosure.

FIG. 7 illustrates one embodiment of a method for inserting a fastening mechanism around an autonomous seismic node.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Node Deployment

Figure 1A:
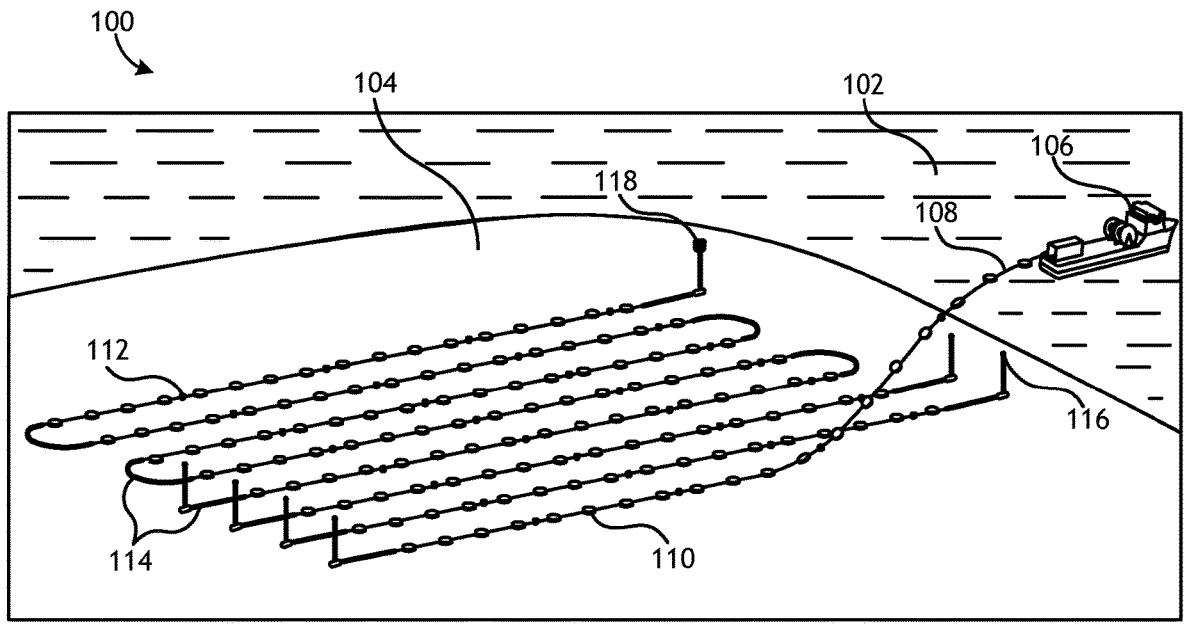
FIG. 1A is a schematic diagram illustrating one embodiment of a system for marine deployment of an autonomous seismic node.
Figure 1B:
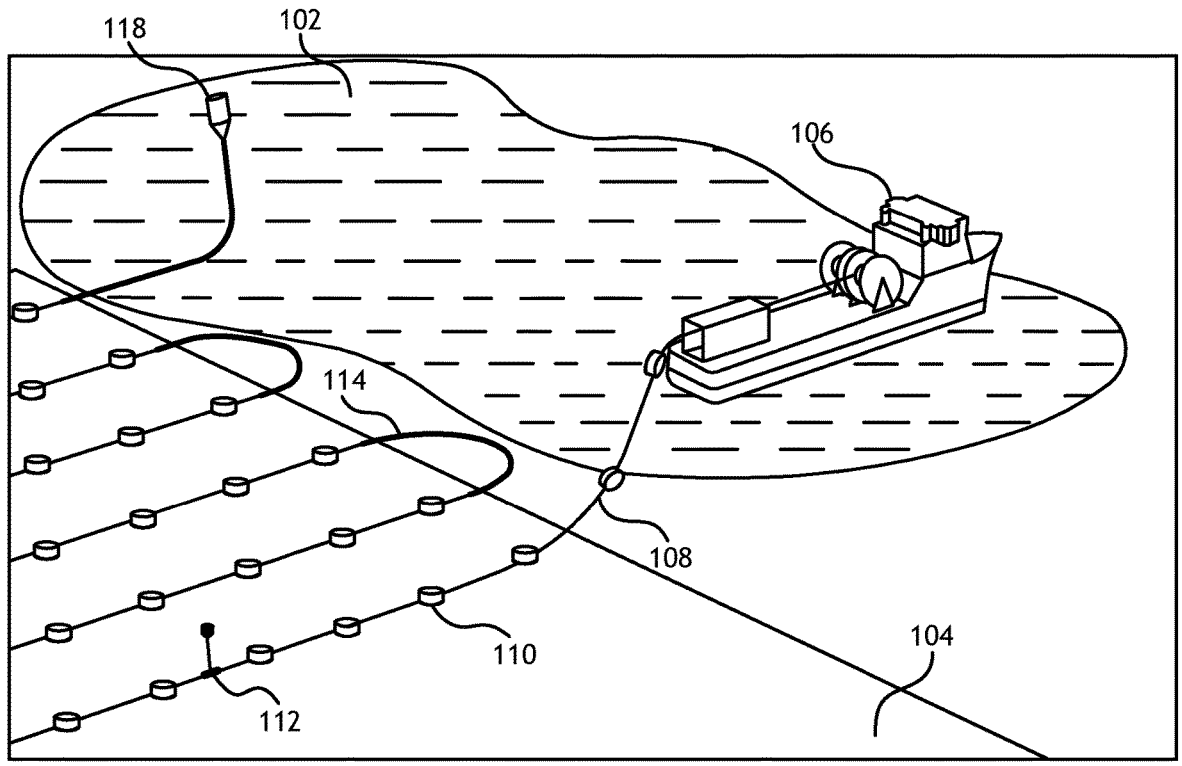
FIG. 1B is a schematic diagram illustrating one embodiment of a system for marine deployment of an autonomous seismic node.

FIGS. 1A and 1B illustrate a layout of a seabed seismic recorder system that may be used with autonomous seismic nodes for marine deployment. FIG. 1A is a diagram illustrating one embodiment of a marine deployment system 100 for marine deployment of seismic nodes 110. One or more marine vessels deploy and recover a cable (or rope) with attached sensor nodes according to a particular survey pattern. In an embodiment, the system includes a marine vessel 106 designed to float on a surface 102 of a body of water, which may be a river, lake, ocean, or any other body of water. The marine vessel 106 may deploy the seismic nodes 110 in the body of water or on the floor 104 of the body of water, such as a seabed. In an embodiment, the marine vessel 106 may include one or more deployment lines 108 (i.e., deployment cables). One or more seismic nodes 110 may be attached directly to the deployment line 108. Additionally, the marine deployment system 100 may include one or more acoustic positioning transponders 112, one or more weights 114, one or more pop up buoys 116, and one or more surface buoys 118. As is standard in the art, weights 114 can be used at various positions of the cable to facilitate the lowering and positioning of the cable, and surface buoys 118 or pop up buoys 116 may be used on the cable to locate, retrieve, and/or raise various portions of the cable. Acoustic positioning transponders 112 may also be used selectively on various portions of the cable to determine the positions of the cable/sensors during deployment and post deployment. The acoustic positioning transponders 112 may transmit on request an acoustic signal to the marine vessel for indicating the positioning of seismic nodes 110 on sea floor 104. In an embodiment, weights 114 may be coupled to deployment line 108 and be arranged to keep seismic nodes 110 in a specific position relative to sea floor 104 at various points, such as during start, stop, and snaking of deployment line 108.

FIG. 1B is a close-up view illustrating one embodiment of a system 100 for marine deployment of seismic nodes 110. In an embodiment, deployment line 108 may be a metal cable (steel, galvanized steel, or stainless steel). Alternatively, deployment line 108 may include chain linkage, rope (polymer), wire, or any other suitable material for tethering to marine vessel 106 and deploying one or more seismic nodes 110. In an embodiment, deployment line 108 and seismic nodes 110 may be stored on marine vessel 106. For example, the deployment line may be stored on a spool or reel or winch. Seismic nodes 110 may be stored in one or more storage containers. One of ordinary skill may recognize alternative methods for storing and deploying deployment line 108 and seismic nodes 110.

In one embodiment, deployment line 108 and seismic nodes 110 are stored on marine vessel 106 and deployed from a back deck of vessel 106, although other deployment locations from the vessel can be used. As is well known in the art, deployment line 108, such as a rope or cable, with a weight attached to its free end is dropped from the back deck of the vessel. Seismic nodes 110 are preferably directly attached in-line to deployment line 108 at a regular, variable, or selectable interval (such as 25 meters) while deployment line 108 is lowered through the water column and draped linearly or at varied spacing onto the seabed. During recovery each seismic node 110 may be clipped off deployment line 108 as it reaches deck level of vessel 106. Preferably, nodes 110 are attached directly onto deployment line 108 in an automated process using node attachment or coupling machines on board the deck of the marine vessel 106 at one or more workstations or containers. Likewise, a node detaching or decoupling machine is configured to detach or otherwise disengage seismic nodes 110 from deployment line 108. Alternatively, seismic nodes 110 can be attached via manual or semi-automatic methods. Seismic nodes 110 can be attached to deployment line 108 in a variety of configurations, which allows for free rotation with self-righting capability of seismic node 110 about deployment line 108 and allows for minimal axial movement on deployment line 108 (relative to the acoustic wave length). For example, deployment line 108 can be attached to the top, side, or center of seismic node 110 via a variety of configurations.

Once deployment line 108 and seismic nodes 110 are deployed on sea floor 104, a seismic survey can be performed. One or more marine vessels 106 may contain a seismic energy source (not shown) and transmit acoustic signals to sea floor 104 for data acquisition by seismic nodes 110. Embodiments of system 100 may be deployed in both coastal and offshore waters in various depths of water. For example, the system may be deployed in a few meters of water or up to several thousand meters of water. In some configurations surface buoy 118 or pop up buoy 116 may be retrieved by marine vessel 106 when seismic nodes 110 are to be retrieved from seabed 104. Thus, system 110 may not require retrieval by means of a submersible or diver. Rather, pop up buoy 116 or surface buoy 118 may be picked up on water surface 102 and deployment line 108 may be retrieved along with seismic nodes 110.

In one embodiment, the seismic nodes may be stored on the back deck of the marine vessel by a node storage and handling system similar to that described in Applicant's U.S. Pat. No. 9,459,366, incorporated herein by reference. In one embodiment, the seismic nodes may be deployed and retrieved from the back deck of the marine vessel by a node deployment similar to that described in Applicant's U.S. Pat. Nos. 9,429,671 and 9,541,663, incorporated herein by reference. While the seismic nodes may be stored on a marine vessel and deployed and retrieved from the marine vessel by a wide variety of techniques, devices, and systems, the present disclosure is not necessarily limited to a particular node holding device or node transfer device or node deployment system. In other words, the nodes may be stored and handled on the back deck of a marine vessel in any number of configurations, and may be deployed and retrieved from the back deck of the vessel by various techniques and/or systems.

Autonomous Node Design

In one or more embodiments, the disclosed fastening device may be utilized in conjunction with any autonomous marine seismic node that is intended to be coupled and/or attached to a deployment line. Methods of deployment of such nodes from a marine vessel to the seabed is well known in the art. For example, Applicant's U.S. Pat. Nos. 9,494,700 and 9,541,663, incorporated herein by reference, discloses one method of coupling nodes to a deployment cable and then deploying that cable to the seabed. Other methods are also well known in the art.

Figure 2A:
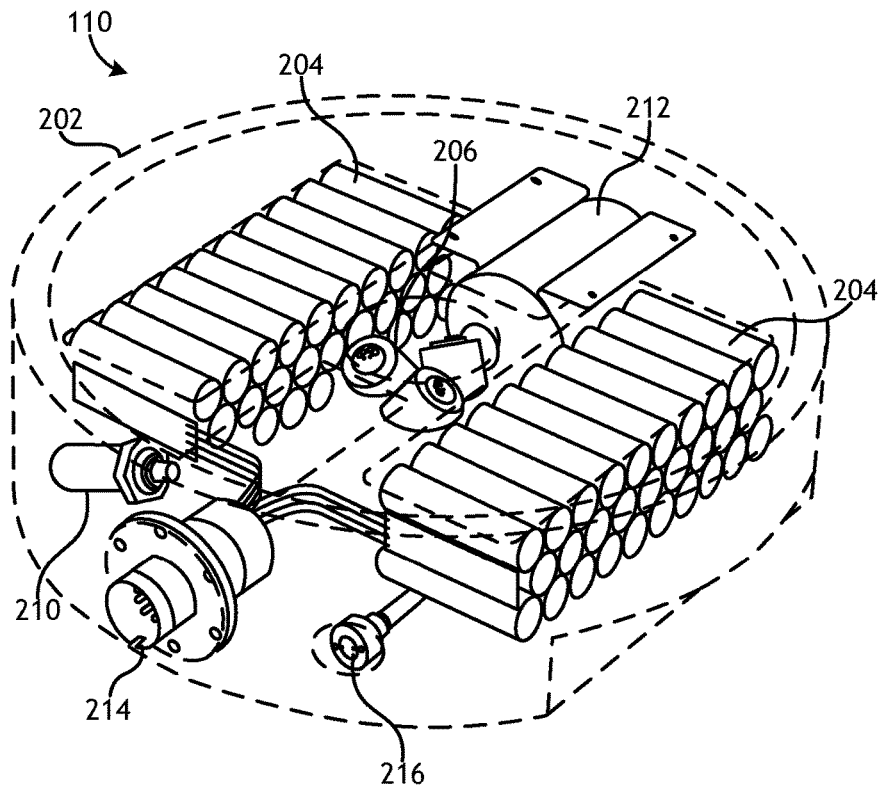
FIG. 2A illustrates a perspective view diagram of one embodiment of an autonomous seismic node.

FIG. 2A illustrates a perspective view diagram of autonomous ocean bottom seismic node 110. Seismic node 110 may include body 202, such as a housing, frame, skeleton, or shell, which may be easily dissembled into various components. Additionally, seismic node 110 may include one or more power sources 204. Additionally, the seismic node may include pressure release valve 216 configured to release unwanted pressure from seismic node 110 at a pre-set level. The valve protects against fault conditions like water intrusion and outgassing from a battery package.

Additionally, the seismic node may include electrical connector 214 configured to allow external access to information stored by internal electrical components, data communication, and/or power transfer. During the deployment the connector is covered by a pressure proof watertight cap 218 (shown in FIG. 2B). In other embodiments, the node does not have an external connector and data is transferred to and from the node wirelessly, such as via wireless electromagnetic or optical links. In other embodiments, there may be multiple connectors on the node, one for data transfer and one connector for power transfer.

In an embodiment, the internal electrical components may include one or more hydrophones 210, one or more (preferably three) geophones 206 or accelerometers, and a data recorder 212. In an embodiment, the data recorder 212 may be a digital autonomous recorder configured to store digital data generated by the sensors or data receivers, such as hydrophone 210 and the one or more geophones or accelerometers 206. One of ordinary skill will recognize that more or fewer components may be included in the seismic node 110. For example, there are a variety of sensors that can be incorporated into the node including and not exclusively, inclinometers, rotation sensors, translation sensors, heading sensors, and magnetometers. Except for the hydrophone, these components are preferably contained within the node housing that is resistant to temperatures and pressures and other seabed conditions (such as salinity) at the bottom of the ocean, as is well known in the art. In an embodiment, the seismic node includes one or more components configured for wireless transmission of data to and from the node via electromagnetic or optical components. Data can be retrieved from the node during deployment or, more preferably, from the node while the node is in a workstation or container on board the marine vessel.

Figure 2B:
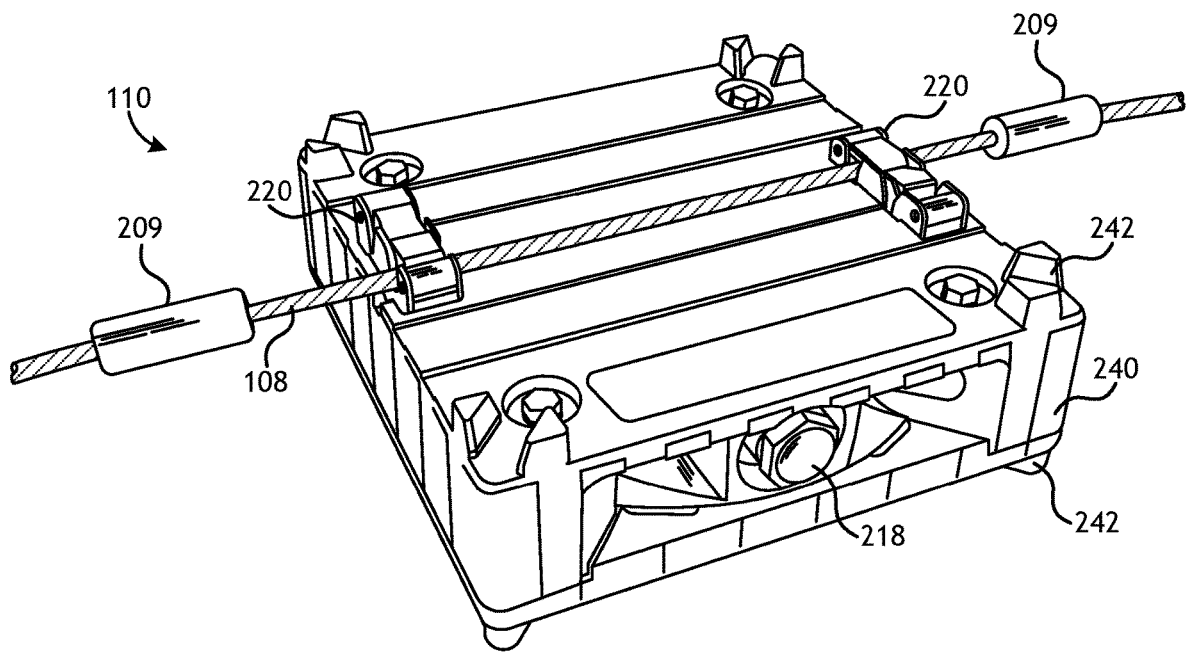
FIG. 2B illustrates a perspective view diagram of one embodiment of an autonomous seismic node with a prior art locking mechanism.

While the node in FIG. 2A is circular in shape, the node can be any variety of geometric configurations, including square, rectangular, hexagonal, octagonal, cylindrical, and spherical, among other designs, and may or may not be symmetrical about its central axis. In one embodiment, the node consists of a watertight, sealed case or pressure housing that contains all of the node's internal components. In another embodiment, the pressure housing is partially and/or substantially surrounded by a non-pressure housing that provides the exterior shape, dimensions, and boundaries of the node. In one embodiment, the node is square or substantially square shaped so as to be substantially a quadrilateral, as shown in FIG. 2B. One of skill in the art will recognize that such a node is not a two-dimensional object, but includes a height, and in one embodiment may be considered a box, cube, elongated cube, or cuboid. While the node may be geometrically symmetrical about its central axis, symmetry is not a requirement. Further, the individual components of the node may not be symmetrical, but the combination of the various components (such as the pressurized housing and the non-pressurized housing) provide an overall mass and buoyancy symmetry to the node. In one embodiment, the node is approximately 350 mm×350 mm wide/deep with a height of approximately 150 mm. In one embodiment, the body 202 of the node has a height of approximately 100 mm and other coupling features, such as node locks 220 or protrusions 242, may provide an additional 20-50 mm or more height to the node.

In another embodiment, as shown in FIG. 2B, the node's pressure housing may be coupled to and/or substantially surrounded by an external envelope or housing 240. Various portions of non-pressure housing 240 may be open and expose the pressure housing as needed, such as for hydrophone 210 and data/power transfer connection 214 (shown with a fitted pressure cap 218 in FIG. 2B). In one embodiment, the upper and lower portions of the housing include a plurality of gripping teeth or protrusions 242 for engaging the seabed and for general storage and handling needs. Non-pressure node housing 240 provides many functions, such as protecting the node from shocks and rough treatment, coupling the node to the seabed for better readings (such as low distortion and/or high fidelity readings) and stability on the seabed, and assisting in the stackability, storing, alignment, and handling of the nodes. Each external housing may be made of a durable material such as rubber, plastic, carbon fiber, or metal, and in one embodiment may be made of polyurethane or polyethylene. In still other embodiments, the seismic node 110 may include a protective shell or bumper configured to protect the body in addition to or in lieu of external housing 240.

Those skilled in the art would appreciate that more or less modules or components may be added to or removed from the node based on the particular needs of the node. For example, the node may or may not include a non-pressure housing surrounding one or more parts of the pressure vessel(s) that form the node. Further, the node may one pressure housing including substantially all of the electronic components of the node or a plurality of pressure housings coupled together that each include one or more of the plurality of electronic components of the node. In other words, the present disclosure does not depend upon the particular layout, shape, and configuration of the node and is not limited to a single design of the node.

One embodiment of prior art latching mechanisms and/or node locks 220 is shown in FIG. 2B, as described in more detail in Applicant's U.S. Pat. No. 9,494,700, incorporated herein by reference, that may be configured to directly attach the seismic node 110 to a deployment line 108. The node locks (and attached nodes) are located on the nodes and may be coupled to and decoupled from the deployment line via a node deployment system, as described in more detail in Applicant's U.S. Pat. No. 9,541,663, incorporated herein by reference. In one embodiment, the node locks 220 in FIG. 2B may be substituted with node latches/receptacles into which a fastening mechanism may be inserted, as more fully described in FIGS. 3A-3D.

Fastening Device

The disclosed embodiment provides a novel solution to one or more of the industry's needs previously described herein and offers advantages over conventional nodes and node attachment mechanisms. The disclosed embodiments include a fastener that is removably attached to a portion of the deployment line and node, and in some embodiments may be a disposable and/or single use node fastening mechanism. Rather than using one or more dedicated node locks on a seismic node (such as that disclosed in Applicant's U.S. Pat. No. 9,494,700), the cable can be directly attached to the node by a disposable or single use fastener. Thus, the fasteners can be quickly attached and detached without complicated installation equipment and/or relying on node locks on the nodes. The fastener can be a single use type fastener or be re-used on multiple nodes. The fastener may allow free rotation of the node around the deployment line or securely clamp or hold the deployment line in a fixed position relative to the node such that it does not freely rotate. Ferrules and/or axial node stoppers on the deployment line may or may not be used. One embodiment may include one or more clamping devices shot and/or compressed onto the wire in a fixed, non-rotatable position, while another embodiment may attach one or more loose-fit clamps pushed over the wire and into matching receptacles on a node brought close to the wire (which may result in a sliding, free-rotating position of the deployment line and seismic node). During recovery of the deployment line, the clamps/fastening mechanisms may be shredded off of the deployment line as the deployment line with nodes are recovered back onto the marine vessel.

Further, while an embodiment of the fastening mechanism is for autonomous seismic nodes, the disclosed fastening mechanism may be utilized with position transponders and other seismic equipment (such as weights, etc.). For example, after a desired number of autonomous seismic nodes are fastened to the deployment line and deployed in a body of water, a transponder may be similarly attached to the deployment line using the same technique and fastener. Of course, the transponder exterior needs to be configured to receive the removable fastener in a similar manner as the seismic nodes. As just one example, both the node and the transponder could be located within or surrounded by a non-pressure housing or shell to which the removable fastener can be inserted into.

Figure 3B:
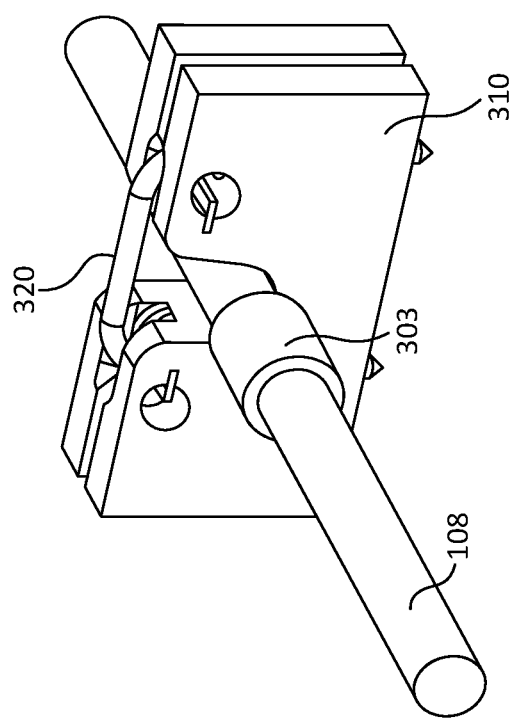
Figure 3A:
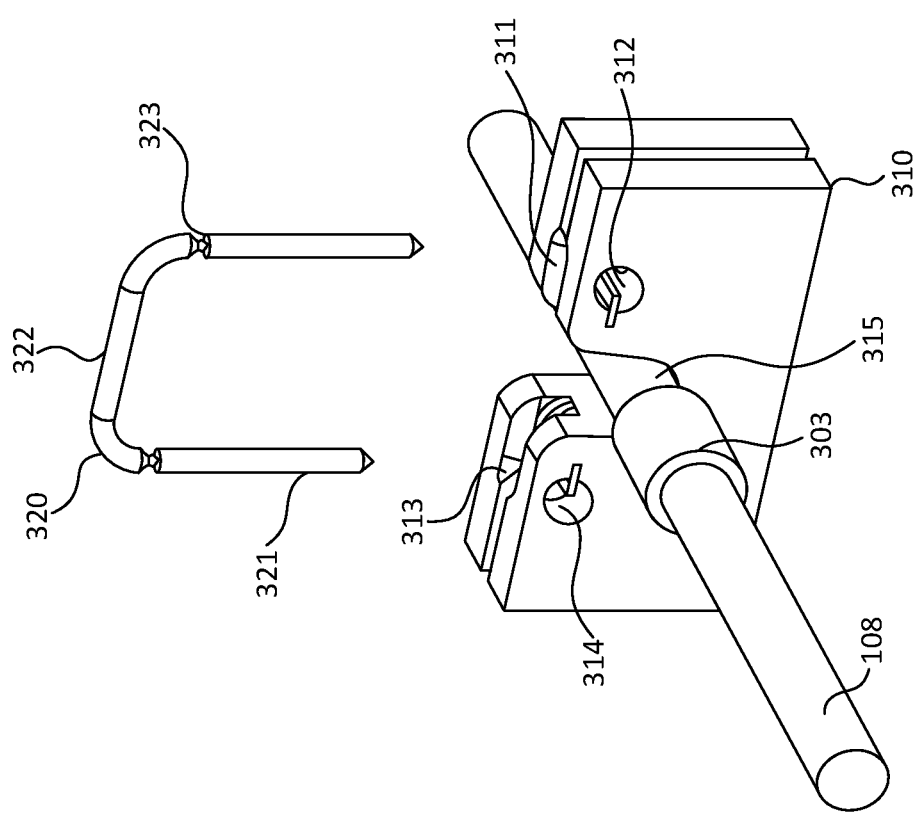

In one embodiment, the fastener is a staple that surrounds a cable and penetrates a distance into the node to securely fasten the cable to the node, as shown in FIG. 3A. A disposable plastic insert or sheath may be placed around the cable or fastener to reduce friction between the cable and the fastener. The fastener may be may secured into the node itself, a housing or enclosure surrounding the node (such as that disclosed in Applicant's U.S. Pat. No. 9,523,780, incorporated herein by reference), or into a receiver or mechanism attached to the node. Other fasteners besides a staple may include bands, wires, pins, straps, ties, clamps, and other similar devices that may be inserted around a portion of the deployment line and be removably coupled to the node. In one embodiment, the node may include and/or be coupled to one or more plastic portions to which the fastener may be secured or stapled into. These plastic portions may be disposable after each use or used multiple times. In one embodiment, the node includes a hard, plastic shell, bumper, or case that surrounds portions of the node (such as the top surface of the node). The fasteners may simply be stapled into the top surface of the shell. In other embodiments, plastic inserts may be attached to a portion of the node and be configured to receive the staples into the plastic inserts. After a certain amount of uses, the plastic inserts may be discarded and new plastic inserts may be installed.

In one embodiment, the node may have a groove to receive the cable, such that the cable sits recessed or flush to an exterior surface of the node. This allows the fastening device to more securely fasten the deployment line to the node with the deployment line being restrained within the groove on the node.

The node may have any configuration or shape, such as circular or round or rectangular, as well as substantially spherical, cylindrical, cuboid, box-like, etc. The node may contain all of the seismic components within a single pressure case or may include a plurality of pressure chambers/components coupled together, such as by a plate, and such pressure housings may or may not be surrounded (partially or entirely) by an external non-pressure housing or case. The cable may be directly attached to an exterior portion of the cable by a staple or other fastener. This avoids use of separate node locks or attachment mechanisms permanently installed on the node. As mentioned above, the present disclosure is not limited to any particular shape or configuration of an autonomous seismic node.

Figure 6:
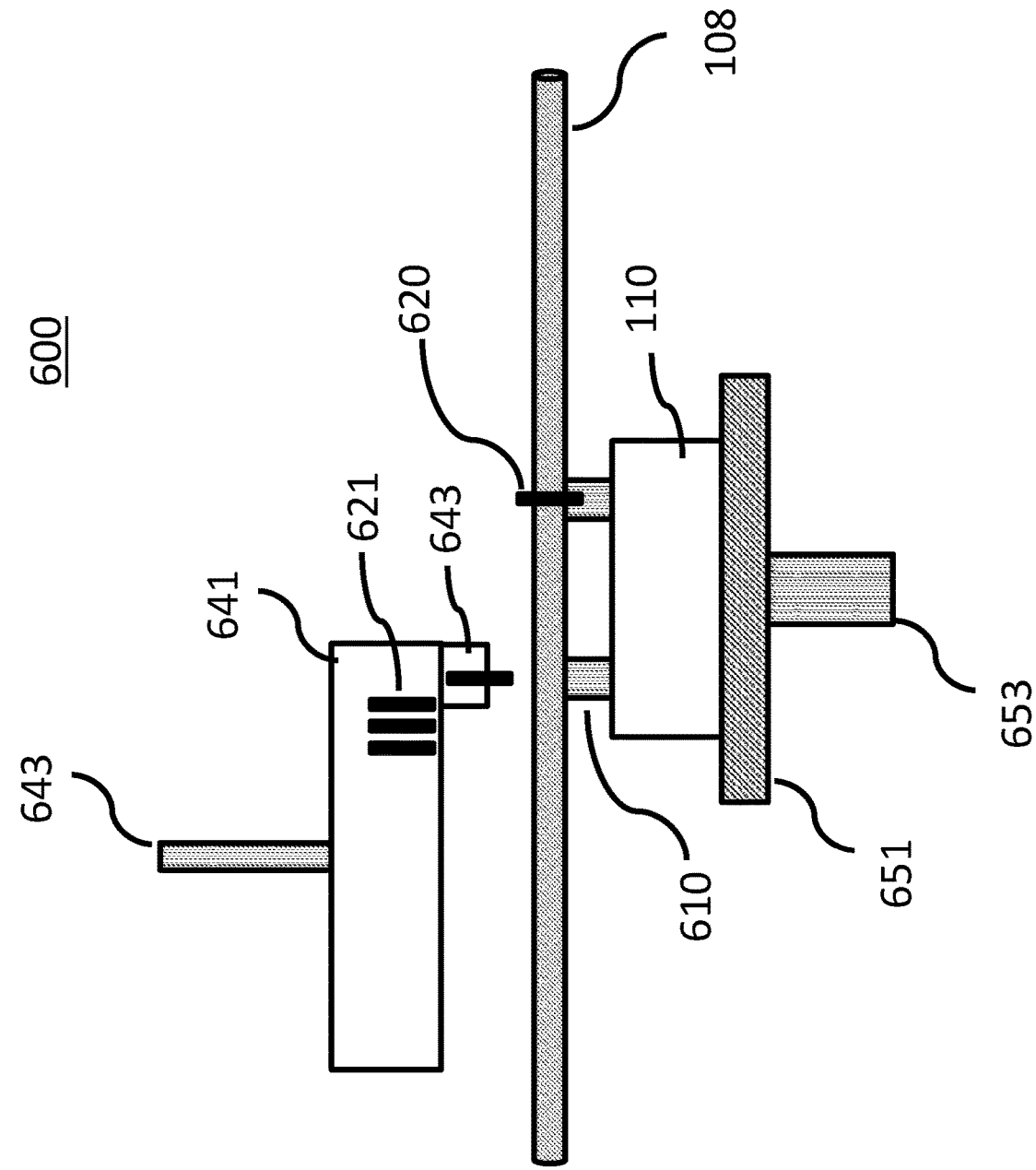
FIG. 6 illustrates one embodiment of a fastening system for insertion of a fastening mechanism for an autonomous seismic node according to the present disclosure.

In one embodiment, the installation machine for such a device is straightforward and may be a large stapler type machine that is configured to shoot a staple or other fastener around the cable and into the node, such as described in relation to FIG. 6. Similar to Applicant's U.S. Pat. No. 9,541,663, the cable may include a plurality of ferrules that the staple machine may detect for placement of the node next to the cable and subsequent attachment of the staple to the cable.

FIGS. 3A-3D illustrate one embodiment of a fastening mechanism for an autonomous seismic node according to the present disclosure. Referring now to FIG. 3A, in one embodiment an autonomous seismic node (not shown) may comprise and/or be coupled to one or more fastener holders or receptacles 310 (such as a latch) that is configured to receive a portion of a deployment line 108 and fastener 320 (such as a staple). The fastener holder 310 can be any of a variety of configurations and is designed for the node and the fastener. In one embodiment, fastener holder 310 may comprise a plurality of holes or openings 311, 313 that are configured to receive portions of the fastener 320. In one embodiment, locking devices 312, 314 may be located within the holes to hold onto and/or secure a portion of the fastener 320 within the openings 311, 313 and/or fastener holder 310. Thus, in one embodiment fastener holder 310 acts as a locking receptacle or mechanism for the separate fastener 320. Fastener holder 310 may also have a notch or opening 315 that is arranged to receive a portion of the deployment line and that also may be configured to stop axial movement of the deployment line by contact with one or more cable stoppers or ferrules 303, as shown in FIG. 3B. Thus, in one embodiment, deployment line 108 has a plurality of stoppers or ferrules 303 attached to different portions of the deployment line to facilitate placement of the autonomous seismic node on the deployment line. In other embodiments, ferrules 303 or similar cable stoppers are not used.

Fastener 320 may be a staple as shown in FIG. 3A. It may be U-shaped including an upper section 322 and a plurality of substantially perpendicular sides 321. Upper portion 322 of the fastener may be placed in contact with deployment line 108 and/or prevent deployment line 108 from coming loose from the node and/or receptacle 310. In one embodiment, fastener 320 may have one or more locking sections 323, which may be arranged to couple with a portion of fastener holder 310 for locking and/or securing fastener 320 to node 110 and/or receptacle 310. As shown in FIG. 3A, the locking section may be a portion of the fastener with a reduced diameter that is arranged to couple with a locking mechanism 312 on receptacle 310. Other fasteners or inserts besides a staple may include bands, wires, pins, straps, ties, clamps, and other similar devices that may be inserted around a portion of the deployment line and be removably coupled to the node and/or fastener receptacle.

FIG. 3B shows fastener 320 inserted into fastener holder 310. As described above, when inserted around the deployment line, the fastener prevents the deployment line from coming loose from the receptacle and/or node and may also be configured to stop axial movement of the deployment line by contact with one or more cable stoppers or ferrules 303. In some embodiments, deployment line 108 has room to move within fastener holder 310, which allows the deployment line to travel in a rotational and longitudinal direction with respect to the fastener holder (and allows the attached node to slide between adjacent ferrules 303). As mentioned above, in some embodiments a sheath or other coating may be located on and/or coupled to portions of the deployment line to reduce friction between the deployment line and the fastener. In one embodiment, once fastener 320 is inserted into fastener holder 310, it stays locked and/or securely fastened to the holder until it is removed by force.

FIG. 3C shows a fastener 320 inserted into the fastener holder 310 with fastener holder illustrated with transparency. In one embodiment, the fastener may be deformed by an external force in the direction of the arrow (such as by a hammer or staple gun) to more securely lock the fastener within the fastener holder and/or to make contact between the fastener and the deployment line. In this embodiment, the deployment line is already placed within a notch of the receptacle prior to inversion of the fastener into the receptacle. As described above, fastener 320 can be a U-shaped staple, such that the lower ends engage and/or couples with fastener holder 310 and an upper section of the fastener engages deployment line 108 and/or prevents deployment line 108 from escaping the fastener receptacle 310. In the embodiment shown in FIG. 3C, when inserted into the receptacle 310, the sides of the fastener 320 may deform and/or be angled, which may be based on the particular receptacle 310 being utilized. Other fastener mechanisms besides a staple, as noted above, may be used. Similarly, other fastener holders besides a latch may be used. In other embodiments, a fastener may be inserted directly into an exterior portion of the node, such as on a plastic or non-metal portion of the node, as described in more detail in FIGS. 5A and 5B.

FIG. 3D shows one illustration of removal of the fastener from the receptacle and/or node. As shown in FIG. 3D, the fastener may be removed from the fastener holder either by pulling the deployment line away from the node/fastener holder or from pulling the node/fastener holder away from the deployment line. In either option, the external force is sufficient to break and/or trigger the holding force of the fastener holder/locking device to the staple. In one embodiment, the staple is a single use and/or disposable staple that is not used again. In other embodiments, the fastener is removable but reusable.

Figure 4A:
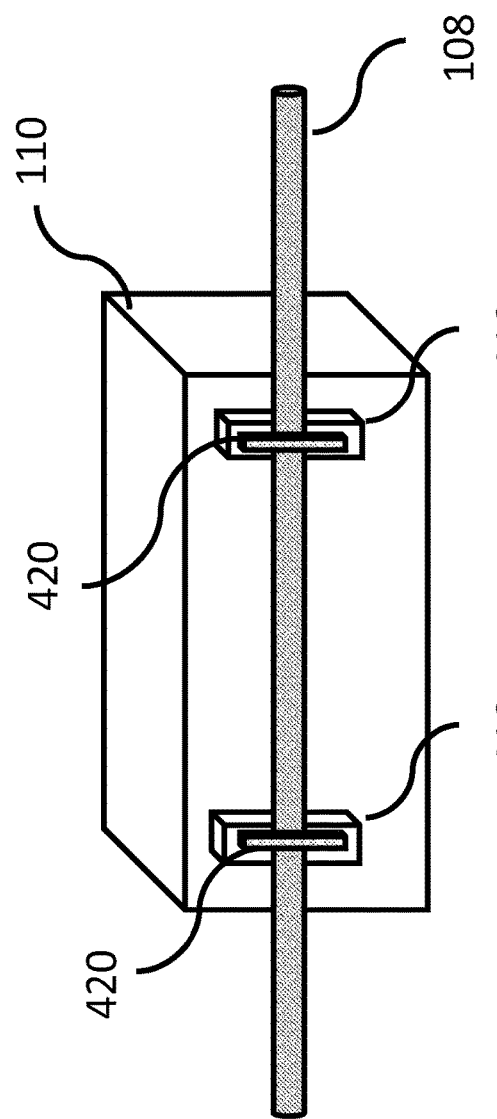
FIGS. 4A and 4B illustrates various embodiments of a fastening mechanism for an autonomous seismic node according to the present disclosure.
Figure 4B:
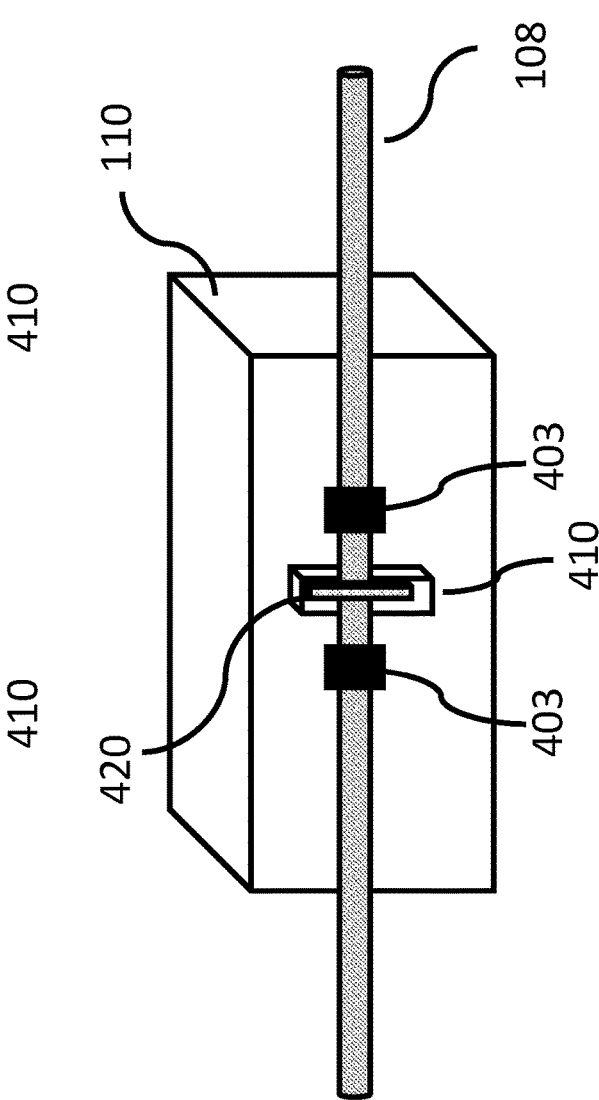

FIGS. 4A and 4B illustrates various embodiments of a fastening mechanism for an autonomous seismic node according to the present disclosure, which may be similar to the system described in relation to FIGS. 3A-3D. FIG. 4A shows node 110 (which may be any variety of shapes and/or configurations) with a plurality of fastener receptacles 410. In one embodiment, two receptacles 410 are located on the same side or face of the node, such as an upper portion of the node. A fastener 420 may be inserted around a portion of the deployment line and into each receptacle 410, thereby coupling the deployment line to the node. In other embodiments, the deployment line may be inserted into the receptacle first followed by insertion of the fastener into the receptacle. FIG. 4B is substantially similar to FIG. 4A, but shows only one receptacle 410 and fastener 420 as opposed to a plurality of fasteners/receptacles. Also, FIG. 4B illustrates cable stoppers 403 (or in some embodiments cable markers or detection points) arranged on either side of fastener 420 and fastener receptacle 410. The receptacles 410 may protrude a certain distance from the surface of the node or be substantially flush with a surface of the node. In other embodiments, an external surface of the node itself may comprise openings or receptacles to receive the fasteners, such that separate receptacles are not necessary.

FIGS. 5A and 5B illustrates various embodiments of a fastening mechanism for an autonomous seismic node according to the present disclosure. In contrast to FIGS. 4A and 4B, fasteners 420 are inserted into a portion of the node or node housing as opposed to separate node receptacles. For example, FIG. 5A shows node 110 that is in a substantially cuboid or box shaped configuration. One side of the node may have a plurality of sections 541 or inserts into which the fasteners may be directly inserted. This system tolerates and/or allows less precision than including separate receptacles 410 on the node as shown in prior figures; such a system is also less complex that requiring separate fastener receptacles. In other embodiments, sections 541 may be non-metallic portions of the node housing into which the fastener may be directly stapled. These non-metallic sections may comprise plastic inserts that may be removably attached to the node after each use or after a certain number of fastener installations renders the plastic insert unusable. In still other embodiments, sections 541 may be metallic portions of the node housing which comprise holes or openings to receive the fasteners.

FIG. 5B is substantially similar to FIG. 5A, but shows only a single plastic portion or insert 543 as opposed to a plurality of inserts 541. Insert 543 is configured to receive a fastener 520. Receiving section 543 may be located on a majority of a surface of a side of the node. Also, FIG. 5B shows the seismic node in a non-rectangular shape, such as substantially cylindrical shape.

FIG. 6 illustrates one embodiment of an installation system for insertion of a fastening mechanism to an autonomous seismic node according to the present disclosure. Fastening installation system 600 illustrates only a potential snapshot of the overall node installation system, which may be otherwise substantially similar to the node installation system described in Applicant's U.S. Pat. No. 9,541,663, incorporated herein by reference. For example, the fastening installation system 600 may be coupled to one or more conveyors that move nodes back and forth from the installation device. The system may be located on the back deck of a marine vessel and may or may not be located within a shipping container. In one embodiment, the installation system 600 is one component and/or system in an overall node deployment system, as is known to one of skill in the art. While FIG. 6 illustrates one potential embodiment of a fastener installation system, the present disclosure is not limited to such and fasteners may be inserted into a node by other systems and/or devices based on the present disclosure.

FIG. 6 shows deployment line 108 passing through fastener installation system 600. System 600 includes fastener machine/installer 641 that inserts fasteners 620 into a node 110. In one embodiment, a node platform 651 may be coupled to a conveyor (not shown) and move the node in relation to deployment line 108 and/or installer 641. Node platform 651 may receive and/or transfer nodes from a separate conveyor and/or node storage and handling system. Node platform 651 may be coupled to one or more lifts and/or cylinders 653 that can move the node a variety of vertical directions. The platform may also comprise one or more devices to move the node horizontally as necessary. Node 110 may comprise a plurality of fastener receptacles 610, which may be substantially similar to those devices described in FIGS. 3A-3D, 4A and 4B. In other embodiments, the fasteners may be directly inserted into the node and such receptacles are not necessary. FIG. 6 shows a first fastener 620 inserted into a first receptacle 610 while a second fastener is about to be inserted into a second receptacle.

Fastener installer 641 may take a variety of shapes, and in one embodiment is similar to a staple gun. A plurality of fasteners may be positioned in a fastener queue 621 that is coupled to the installer, such as being within the installer itself. This may be similar to how a staple gun uses a plurality of staples prior to insertion of the staples into an external device. Installer 641 may be located a certain height above the deployment line and may move vertically as necessary based on one or more lifts and/or cylinders 643. The installer may also be able to move horizontally (in both X and Y directions) as necessary. The installer 641 may have one or more detection sensors or devices configured to detect the placement position of the fastener to the deployment line, such as by measuring a length of the deployment line or detecting one or more cable markers or stoppers (such as ferrules) on the deployment line. In one embodiment, the detection systems may include light curtains, proxy switches, and similar sensors.

The fasteners may be attached to the node while the deployment line is moving (whether a constant speed or variable speed) or during intermittent periods of cable stopping. In one embodiment, the node is moved to the correct height under the deployment line based on vertical movement of the node platform. The fastener installer 641 may be moved and/or located a predetermined distance above the deployment line. At the appropriate location based on movement of the deployment line, the fastener is inserted into a receptacle 610 of the node, thereby coupling the deployment line to the node. In one embodiment, a head portion 643 of the fastener installer moves vertically during installation of the fastener, while in other embodiments the entire installer 641 moves during installation of the fastener either vertically or horizontally.

In operation, a method of fastening a node to a deployment line is shown in FIG. 7, which may include portions which are manually or automatically performed. In one embodiment, method 700 comprises positioning a portion of a deployment line adjacent to an autonomous seismic node on a back deck of a marine vessel, as shown in step 702. This may include either moving the deployment line closer to the node or moving the node closer to the deployment line. In some embodiments, as shown in FIG. 3A, method 700 may also include positioning the deployment line into one or more fastener holders or receptacles on the node.

In one embodiment, method 700 comprises positioning one or more fastening mechanisms (such as fasteners and/or staples) adjacent to the autonomous seismic node, as shown in step 704. In one embodiment, a staple gun or similar fastening machine is moved adjacent to the nodes and/or deployment line such that it is in a position to couple the fasteners to the nodes.

In one embodiment, method 700 comprises coupling one or more fasteners to the autonomous seismic node, as shown in step 706. This step may include inserting the fastening mechanisms around a portion of the deployment line and into the autonomous seismic node. This step may simply include inserting a fastening mechanism directly into a body portion of the node to securely fasten the deployment line to the node (similar to FIGS. 5A and 5B). In other embodiments, the fastening mechanism may be inserted into fastener receptacles on the node (similar to FIGS. 4A and 4B). In other embodiments, the positioning of step 704 is substantially performed at the same time as the insertion of step 706. In other embodiments, as shown in FIG. 3C, method 700 may also include deforming and/or locking the fastener, which may increase locking of the fastener with the fastener holder and/or the deployment line. In one embodiment, method 700 may comprise locking one or more fasteners into a receptacle on the autonomous seismic node, as shown in step 708. This may include engaging a portion of the fastener with a spring lock or similar locking mechanism.

These steps may be repeated until the desired number of fasteners are coupled to the desired number of nodes. Once the nodes are deployed from the back deck of the marine vessel and the seismic survey is performed, the deployment line may be retrieved with the attached seismic nodes. During retrieval, the fasteners may be removed in a reverse fashion of the above steps. In one embodiment, the fastening mechanisms may be removed by force by pulling either the deployment line from the node or the node away from the deployment line (see, e.g., FIG. 3D). The fastening mechanisms may be discarded, and the nodes may be stored until further needed as is known in the art.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the configurations of the autonomous seismic unit, fastener (e.g., staple), and fastener holder (e.g., latch) are within the scope of the invention. For example, the autonomous seismic unit may be of any configuration, and may be designed to couple to the seabed or merely near the seabed. The fastener may be a single use/disposable staple or may be intended for multiple uses. A fastener holder may or may not be used. Ferrules and/or axial node stoppers on the deployment line may or may not be used (e.g., the deployment line may be simply a naked wire/rope). It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A seismic node for marine deployment to the seabed, comprising:
    one or more fastener receptacles configured to secure a portion of a deployment line to the node by one or more removable fastening devices, wherein the one or more fastener receptacles is configured to receive the one or more removable fastening devices,
    wherein the one or more fastening devices comprises a staple.

2. The node of claim 1, wherein the one or more fastener receptacles comprises a latch.

3. The node of claim 1, wherein the one or more fastener receptacles comprises one or more locking devices.

4. The node of claim 1, wherein the one or more fastener receptacles is substantially flush with an exterior portion of the node.

5. The node of claim 1, wherein the one or more fastener receptacles comprises a removable plastic insert.

6. The node of claim 1, wherein the fastening device is configured to be removed from the seismic node by force.

7. The node of claim 1, wherein the staple is substantially U-shaped.

8. The node of claim 1, wherein the staple is deformable.

9. The node of claim 1, wherein the staple is configured to allow free rotation of the node around the deployment line.

10. An attachment device for attaching a seismic node to a deployment line, comprising:
    at least one fastening receptacle configured to secure a portion of a deployment line to a seismic node, wherein the fastening receptacle is configured to receive a removable fastening device and a portion of the deployment line,
    wherein the fastening device comprises a staple.

11. The attachment device of claim 10, wherein the removable fastening devices is configured to surround a portion of the deployment line when inserted into the fastening receptacle.

12. The attachment device of claim 10, wherein the fastening device is configured to be removably attached to the fastening receptacle.

13. The attachment device of claim 10, wherein the fastening device is configured to be automatically inserted into the fastening receptacle by an external device.

14. The attachment device of claim 10, wherein the fastening receptacle is a latch.

15. The attachment device of claim 10, wherein the fastening device is configured to be removed from the fastening receptacle by force.

16. The attachment device of claim 10, wherein the fastening receptacle is configured to be coupled to an exterior housing of the node.

17. A method for deploying a plurality of seismic nodes into a body of water, the method comprising:
    deploying a deployment line into a body of water from a back deck of a marine vessel; and attaching a plurality of seismic nodes to the deployment line during deployment by
coupling a removable fastening mechanism to each of the plurality of seismic nodes and a portion of the deployment line,
wherein the fastening mechanism comprises a staple.

18. The method of claim 17, wherein the attaching step further comprises inserting the fastening mechanism into the seismic node.

19. The method of claim 18, wherein the inserting step comprises inserting the fastening mechanism into a receptacle on the seismic node.

20. The method of claim 17, wherein the coupling step comprises inserting the fastening mechanism into a fastening receptacle and coupling the fastening receptacle to the seismic node.

21. The method of claim 17, further comprising positioning a portion of the deployment line next to the seismic node.

22. The method of claim 17, further comprising locking the fastening mechanism to the seismic node.

* * * * *